(12) United States Patent
Hipshier et al.

(10) Patent No.: US 9,694,731 B2
(45) Date of Patent: Jul. 4, 2017

(54) VEHICLE INTERIOR STORAGE COMPARTMENT

(71) Applicant: Yanfeng Global Automotive Interior Systems Co., Ltd., Plymouth, MI (US)

(72) Inventors: Jason M. Hipshier, Hudsonville, MI (US); David John McCarthy, Holland, MI (US)

(*) Notice: Subject to any disclaimer, the term of this patent is extended or adjusted under 35 U.S.C. 154(b) by 0 days.

(21) Appl. No.: 14/888,272

(22) PCT Filed: Apr. 30, 2014

(86) PCT No.: PCT/US2014/036135
§ 371 (c)(1),
(2) Date: Oct. 30, 2015

(87) PCT Pub. No.: WO2014/179444
PCT Pub. Date: Nov. 6, 2014

(65) Prior Publication Data
US 2016/0059760 A1    Mar. 3, 2016

Related U.S. Application Data

(60) Provisional application No. 61/817,603, filed on Apr. 30, 2013.

(51) Int. Cl.
| | |
|---|---|
| *B60N 3/10* | (2006.01) |
| *B29C 44/04* | (2006.01) |
| *B29C 44/08* | (2006.01) |
| *B29C 44/12* | (2006.01) |
| B29K 105/04 | (2006.01) |
| B29L 31/30 | (2006.01) |
| B29K 101/10 | (2006.01) |

(52) U.S. Cl.
CPC .......... *B60N 3/101* (2013.01); *B29C 44/0407* (2013.01); *B29C 44/08* (2013.01); *B29C 44/1214* (2013.01); *B29C 44/1271* (2013.01); *B29K 2101/10* (2013.01); *B29K 2105/043* (2013.01); *B29L 2031/3005* (2013.01)

(58) Field of Classification Search
CPC .......... A47G 23/02; B60N 3/10; B60N 3/101; B60N 3/103; B60N 3/106; B60R 7/04; B60R 7/046; B60R 7/08
USPC ................. 296/24.34, 37.8, 37.12, 37.13
See application file for complete search history.

(56) References Cited

U.S. PATENT DOCUMENTS

| | | | |
|---|---|---|---|
| 3,863,277 A | 2/1975 | Harrison | |
| 5,275,779 A * | 1/1994 | Marfilius | ............. B60N 2/4613 |
| | | | 156/292 |

(Continued)

FOREIGN PATENT DOCUMENTS

| | | |
|---|---|---|
| DE | 4132571 | 10/1992 |
| DE | 102005019485 | 11/2006 |
| WO | 2011143467 | 11/2011 |

OTHER PUBLICATIONS

PCT International Search Report and Written Opinion mailed Sep. 4, 2014.

*Primary Examiner* — Jason S Daniels

(57) ABSTRACT

A vehicle interior storage compartment is disclosed. The vehicle interior storage compartment is configured to store a beverage container. The vehicle interior storage compartment includes a substrate and a foam liner having a skin secured to the substrate during a forming process. The liner includes at least one protrusion configured to deform.

20 Claims, 6 Drawing Sheets

(56) References Cited

U.S. PATENT DOCUMENTS

| | | | |
|---|---|---|---|
| 5,389,693 A | 2/1995 | DeGenova et al. | |
| 5,509,633 A | 4/1996 | Ruster et al. | |
| 6,050,468 A * | 4/2000 | Kelley | B60N 3/103 224/542 |
| 8,360,380 B2 * | 1/2013 | Soma | B60N 3/101 224/926 |
| 2007/0075205 A1 * | 4/2007 | Shin | B60N 3/106 248/311.2 |
| 2011/0025105 A1 * | 2/2011 | Henke | B60N 2/4613 297/188.14 |
| 2013/0017356 A1 * | 1/2013 | Hipshier | B29C 44/5681 428/76 |

\* cited by examiner

VEHICLE INTERIOR STORAGE COMPARTMENT

CROSS REFERENCE TO RELATED APPLICATIONS

The application is a national stage of PCT Application No. PCT/US2014/036135, entitled "VEHICLE INTERIOR STORAGE COMPARTMENT HAVING AN INTEGRAL SKIN SHOW SURFACE", filed on Apr. 30, 2014, which claims priority from and the benefit of U.S. Provisional Patent Application Ser. No. 61/817,603, entitled "VEHICLE INTERIOR STORAGE COMPARTMENT HAVING AN INTEGRAL SKIN SHOW SURFACE", filed Apr. 30, 2013. Each of the listed applications is incorporated by reference in its entirety.

FIELD

The present invention relates generally to a vehicle interior storage compartment.

BACKGROUND

Cup holders may be positioned throughout a vehicle interior for securing beverage containers. For example, the center console, armrests, door panels, or other interior structures of the vehicle may include one or more cup holders. Certain cup holder configurations include a recess within the interior structure, and a liner inserted within the recess. The liner is configured to secure the beverage container within the recess, limiting movement of the beverage container during vehicle operation. Typical cup holders may accommodate a variety of cups, cans, bottles, and the like. Typical liners may not provide effective thermal insulation for beverage containers within the cup holder. The temperature of warm and/or cool beverages may rapidly approach the temperature of the vehicle interior. Typical liners may not absorb a significant amount of sound (e.g., associated with contact between objects within the cup holder). Objects (e.g., coins) impacting one another during operation of the vehicle may generate undesirable noise.

SUMMARY

The present invention relates to a vehicle interior storage compartment comprising a receptacle and at least one cup holder.

The present invention relates to a receptacle for a vehicle interior configured to store a container providing a beverage. The receptacle includes a substrate and a foam liner having a skin secured to the substrate during a forming process. The liner includes at least one protrusion configured to deform.

The present invention relates to a receptacle for a vehicle interior configured to store a container providing a beverage. The receptacle includes a substrate having an opening, and a protrusion. The protrusion is formed from foam having a skin and configured to deform.

The present invention relates to a method for forming a receptacle for a vehicle interior. The method includes providing a substrate in a mold, and providing foam in the mold to form a liner and bond the liner to the substrate.

FIGURES

DETAILED DESCRIPTION

Figure 1:
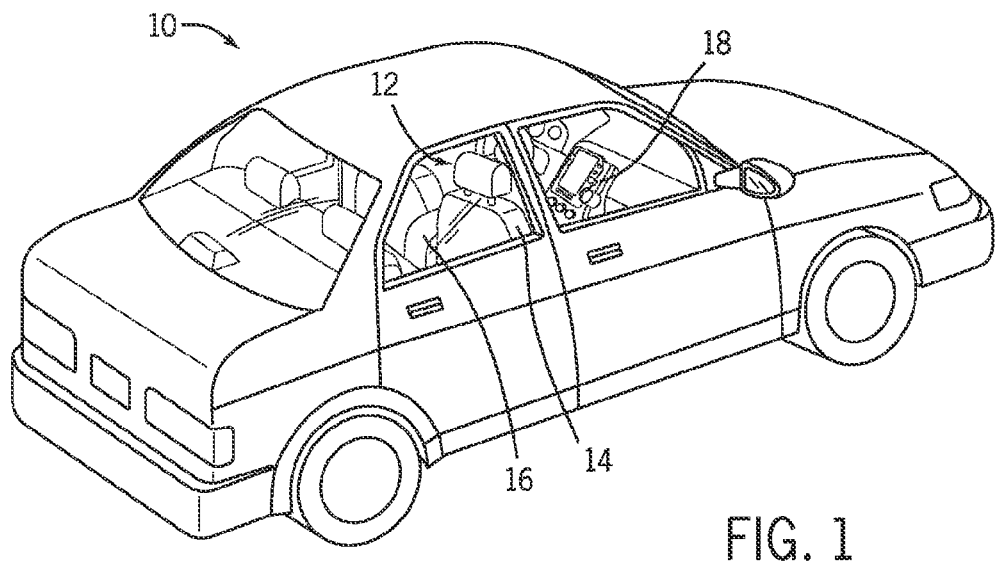
FIG. 1 is a schematic perspective view of an exemplary vehicle that includes one or more storage compartments each having a foam liner or foam projections with a skin forming a surface, according to an exemplary embodiment.

FIG. 1 is a schematic perspective view of a motor vehicle 10 that includes an interior storage compartment having a skin forming a surface, according to an exemplary embodiment. According to an exemplary embodiment, the vehicle 10 includes an interior 12 having a seat 14, an armrest 16, and a center console 18. According to an exemplary embodiment, the seat 14, armrest 16, center console 18 and/or other areas within the interior 12 include cup holder assemblies configured to secure beverage containers. According to an exemplary embodiment, the cup holder assembly includes a foam liner or foam projections having a skin forming a surface. According to an exemplary embodiment, the cup holder assembly includes a substrate having a cavity and a foam liner coupled to the substrate (e.g., bonded to an interior surface of the cavity). A foam liner forms a recess configured to receive an object (e.g., beverage container, portable electronic device, etc.) for storage. The foam liner includes a skin forming a surface of the recess. The skin is configured to substantially block leakage of liquid (e.g., from condensation on a beverage container, from leakage from the beverage container, etc.) through the foam liner, substantially reducing or eliminating the possibility of contact between liquid and electronic components beneath the cup holder assembly. According to an exemplary embodiment, the foam liner absorbs sound associated with contact between objects within the cup holder assembly. For example, the foam liner substantially reduces the noise associated with coins impacting one another during operation of the vehicle, enabling a driver to focus on the surrounding environment. According to an exemplary embodiment, the foam liner thermally insulates a beverage container within the cup holder assembly to maintain the temperature of liquid within the beverage container.

According to an exemplary embodiment, the cup holder assembly includes multiple foam projections coupled to the substrate and extending radially inward from the cavity/recess. A surface of each foam projection is configured to engage the beverage container to support the beverage container within the cavity/recess. Each foam projection includes a skin forming the surface of the projections.

According to an exemplary embodiment, the surface may comprise a show surface, an integral skin, or an integral skin show surface. A "show surface" refers to a surface of an object (e.g., the foam liner, the foam projections, etc.) facing the interior 12 of the vehicle 10 (e.g., the interior of the cup holder recess/cavity). For example, the show surface (or exterior facing surface) of the foam liner and/or the show surface (or exterior facing surface) of the foam projections may face away from the substrate. According to an exemplary embodiment, at least a portion of the show surface of the foam liner corresponds to a radially inward facing surface of the recess. At least a portion of the show surface of a foam projection may face radially inward toward the interior of the recess/cavity. The show surface of the foam liner and/or the foam projections may be visible (directly) to a vehicle occupant or may be covered by a decorative layer (e.g., an applique, an in-mold painted layer, a post-molding painted layer, etc.) to enhance the appearance of the foam component.

Figure 2:
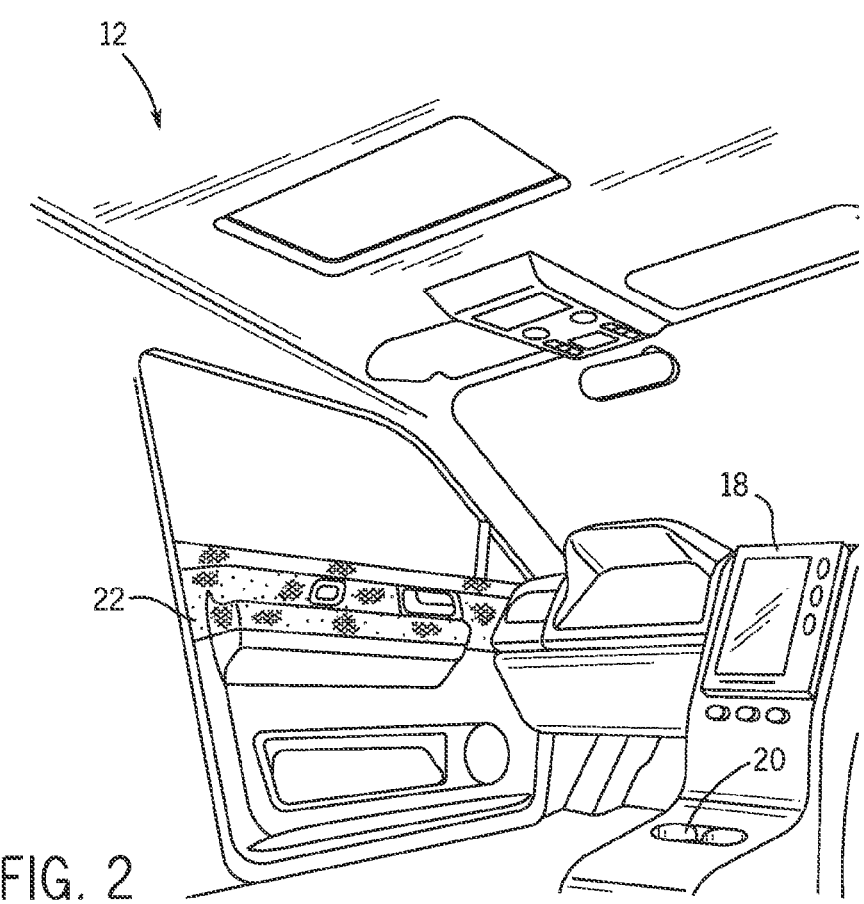
FIG. 2 is a schematic perspective view of a part of the interior of the vehicle of FIG. 1, according to an exemplary embodiment.

FIG. 2 is a schematic perspective view of a part of the interior 12 of the vehicle 10 of FIG. 1, according to an exemplary embodiment. According to an exemplary embodiment, the vehicle interior 12 includes the center console 18 having a cup holder assembly 20. Cup holders may be positioned throughout the interior 12 of the vehicle 10. For example, cup holders may be positioned within an interior door panel 22, an armrest, or within the seats 14. The cup holder assembly 20 may include a foam liner having a recess configured to receive an object (e.g., beverage container, portable electronic device, etc.) for storage. The foam liner includes a skin forming a surface of the recess. The foam liner may thermally insulate the beverage container and/or absorb sound from objects in the assembly (e.g., stored or contained objects). According to an exemplary embodiment, the skin may function as a barrier to substantially block liquid flow through the liner (e.g., intended to prevent or reduce liquid from a beverage container from contacting components beneath the assembly).

Figure 3:
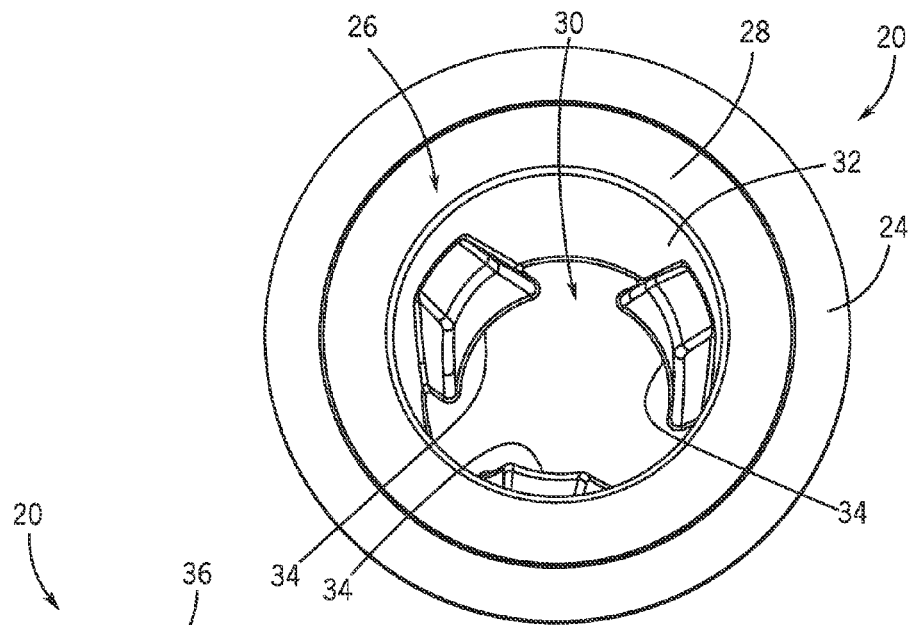
FIG. 3 is a schematic top perspective view of an embodiment of a cup holder assembly having a foam liner with a skin forming a surface, according to an exemplary embodiment.

FIG. 3 is a schematic top perspective view of an embodiment of a cup holder assembly having a foam liner with a skin forming a surface, according to an exemplary embodiment. According to an exemplary embodiment, the cup holder assembly 20 includes a substrate 24 having a cavity 26. The substrate 24 may be formed by an injection molding process, and may therefore be composed of any suitable material for injection molding. For example, the substrate 24 may be composed of a thermoplastic polymer, such as polyamide, polycarbonate, or acrylonitrile butadiene styrene (ABS). The substrate 24 may be composed of other materials suitable for injection molding according to an exemplary embodiment. The substrate 24 may include agents or additives, such as a chemical blowing agent and/or any other suitable additives.

The cup holder assembly 20 also includes a foam liner 28 bonded to an interior surface of the cavity 26 and forming a recess 30 configured to receive an object for storage. According to an exemplary embodiment, the foam liner includes a skin forming a surface 32 of the recess 30. The skin may substantially block liquid flow through the liner 28, substantially reducing or eliminating the possibility of contact between liquid from a beverage container and components beneath the cup holder assembly. According to an exemplary embodiment, the foam liner 28 is formed by a molding process in which two reactive foam compounds are mixed and poured into an open mold having the desired shape of the liner 28. The mold is then closed and the mixture is allowed to expand and cure. The substrate 24 is placed into the mold prior to pouring the foam, and the foam bonds to the substrate 24 during the foaming process (e.g., while the foam expands and cures). A unitary compressible component is formed. According to an exemplary embodiment, chemical properties of the material under the operating conditions (e.g., temperature variations within the mold) form a skin (e.g., a high density flexible outer skin) on the outer surface of the foam or base structure (e.g., low density foam liner). According to an exemplary embodiment, the foam liner 28 provides a desired (e.g., substantially smooth or textured) skin over a compressible base structure sized to secure beverage containers of various shapes and diameters.

According to an exemplary embodiment, paint may be applied to the mold during the forming process (e.g., before the foam compounds are injected); the paint layer bonds with the foam adjacent to the inner surface of the mold, establishing a desired color surface for the outer skin. According to an exemplary embodiment, the color of the outer skin may be selected to match the color of a fabric seat covering. The in-mold painting process may provide an efficiency (e.g., reduce the duration and/or complexity of the painting process), compared to a spraying paint process (e.g., spraying paint on a surface of the concave recess).

According to an exemplary embodiment, the foam liner 28 includes protrusions 34 (e.g., resilient protrusions) configured to deform to accommodate various beverage container diameters. The protrusions 34 are configured to flex upon contact with a beverage container. The foam liner 28 may support a variety of beverage container diameters. For example, as a beverage container is inserted into the recess 30, contact between the beverage container and the protrusions 34 induces the protrusions to flex toward an interior surface of the recess 30. Larger diameter beverage containers induce the protrusions 34 to flex more than smaller diameter beverage containers. The protrusions 34 facilitate securing a variety of beverage containers having different diameters. Contact between the protrusions 34 and the beverage container serves to secure the beverage container within the recess 30. The illustrated cup holder assembly 20 includes three protrusions 34, and alternative embodiments may include one or more protrusions.

Figure 4A:
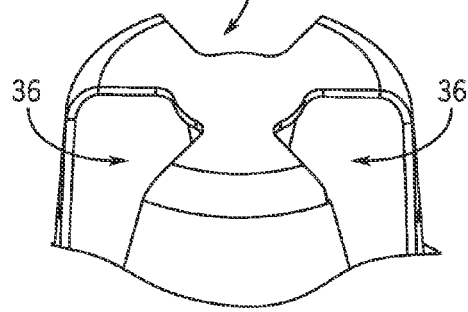
FIGS. 4 and 4A are schematic bottom perspective views of the cup holder assembly shown in FIG. 3, according to an exemplary embodiment.
Figure 4:
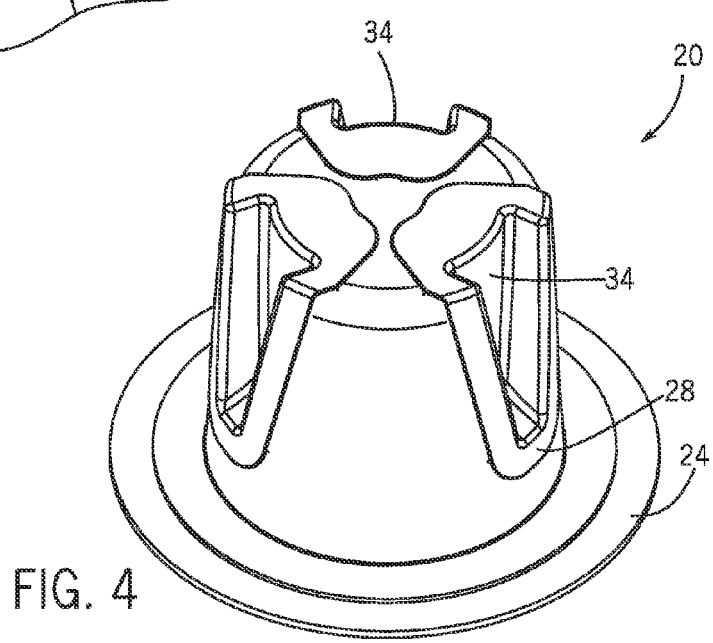

FIGS. 4 and 4A are schematic bottom perspective views of the cup holder assembly shown in FIG. 3, according to an exemplary embodiment. According to an exemplary embodiment, the substrate 24 includes openings 36, as shown in FIG. 4A, extending from an interior surface of the cavity 26 to an exterior surface of the cavity. The foam liner 28 extends through each opening 36, as shown in FIG. 4, and the foam liner 28 is bonded to the interior and exterior surfaces of the cavity near the opening. A durable bond is established between the foam liner 28 and the substrate 24, substantially reducing or eliminating the possibility of substrate/liner separation during insertion and removal of a beverage container from the recess. Each protrusion 34 on the foam liner 28 is in a position to fit in a corresponding opening 36 in the substrate 24. The openings 36 are enlarged relative to the protrusions 34 to facilitate deformation of the protrusions 34 beyond the radial extent of the recess 30; the recess accommodates beverage containers.

Figure 5:
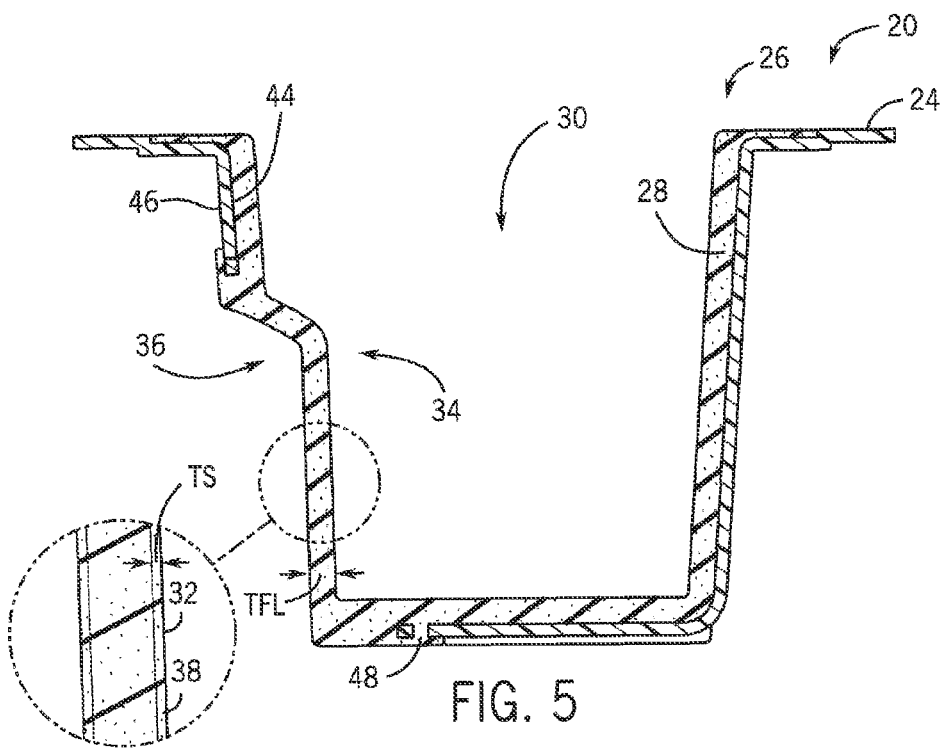
FIG. 5 is a schematic cross-sectional view of an embodiment of a cup holder assembly, according to an exemplary embodiment.

FIG. 5 is a schematic cross-sectional view of an embodiment of a cup holder assembly, according to an exemplary embodiment. According to an exemplary embodiment, the substrate 24 is coupled to the foam liner 28. The substrate 24 may be formed by an injection molding process. Injection molding involves injecting liquid resin into a mold to form a completed part. Once the substrate 24 has been formed, the substrate 24 may be placed into a mold having a cavity shaped to form the foam liner 28. Foam may then be poured into the mold. During the foaming process (e.g., while the foam expands and cures), the foam bonds to the substrate 24, forming a unitary structure including the substrate 24 and the liner 28. Due to the material chemistry as well as temperature variations within the mold, a high density flexible outer skin 38 is formed around the low density foam of the liner 28. The skin 38 may serve to protect the low density foam (e.g., from liquid within the recess 30), while providing a desirable appearance to the cup holder assembly 20. The skin 38 is configured to substantially block liquid flow through the foam liner 28.

A thickness TFL of the foam liner 28 may be particularly selected to thermally insulate a beverage container within the cup holder assembly to maintain the temperature of liquid within the beverage container for an extended duration. The thickness TFL of the foam liner may be particularly selected to absorb sound associated with contact between objects within the cup holder assembly. The thickness TFL may also be particularly selected to provide the protrusions 34 with a desired resistance to deformation. For example, a thicker liner may establish protrusions 34 having a higher resistance to deformation, and a thinner liner may establish protrusions 34 with a lower resistance to deformation. According to an exemplary embodiment, the thickness TFL may be greater than approximately 5 mm. For example, the thickness TFL may be approximately between 5 to 15, 6 to 13, 7 to 11, or about 9 mm. A thickness TS of the skin 38 may be particularly selected to enable the skin to flex as the liner 28 is compressed (e.g., via contact with a beverage container). For example, the thickness TS of the skin 38 may be less than approximately 2, 1.5, 1, 0.5, 0.3, 0.2, or 0.1 mm, or less.

The substrate 24 includes openings 36 extending from an interior surface 44 of the substrate cavity 26 to an exterior surface 46 of the substrate cavity 26. According to an exemplary embodiment, the foam liner 28 extends through the opening 36 and is bonded to the interior surface 44 and the exterior surface 46 near the opening 36. Bonding the foam liner 28 to the interior and exterior surfaces of the substrate 24 substantially reduces the possibility of substrate/liner separation during operation of the vehicle and/or while inserting and removing a beverage container from the recess 30. The protrusion 34 is substantially aligned with the opening 36. The protrusion 34 is configured to deform to accommodate various beverage container diameters. The opening 36 facilitates deformation of the protrusion 34 beyond the radial extent of the recess 30, thereby enabling the recess to accommodate larger diameter beverage containers.

According to an exemplary embodiment, the substrate 24 includes an opening or aperture 48. As the foam expands during the molding process, the foam enters and extends through the aperture 48, providing a mechanical lock between the foam liner 28 and the substrate 24. The configuration enhances the bond between the liner 28 and the substrate 24. The substrate 24 includes a single aperture 48, and further embodiments may include additional apertures distributed throughout the cavity 26, each configured to establish a mechanical lock between the foam liner 28 and the substrate 24. According to an exemplary embodiment, the substrate 24 may include at least 1, 2, 4, 6, 8, 10, 15, 20, or more apertures.

According to an exemplary embodiment, the mold cavity which forms the foam liner 28 may have a substantially smooth surface, establishing a substantially smooth surface 32 of the skin 38. Smoothness may be defined by dimensional variations within the surface 32 of the liner 28. For example, dimensional variations within the surface 32 may be between approximately 0.5 to 0.01, 0.3 to 0.03, 0.2 to 0.05, or about 0.1 mm. By further example, dimensional surface variations may be less than approximately 0.5, 0.3, 0.2, 0.1, 0.05, 0.03, or about 0.01 mm. Such a smooth surface 32 may enhance the appearance of the vehicle interior 12 and/or facilitate application of a decoration. According to an exemplary embodiment, the mold cavity which forms the foam liner 28 may have a textured surface, establishing a textured surface 32 of the skin 38.

Figure 6:
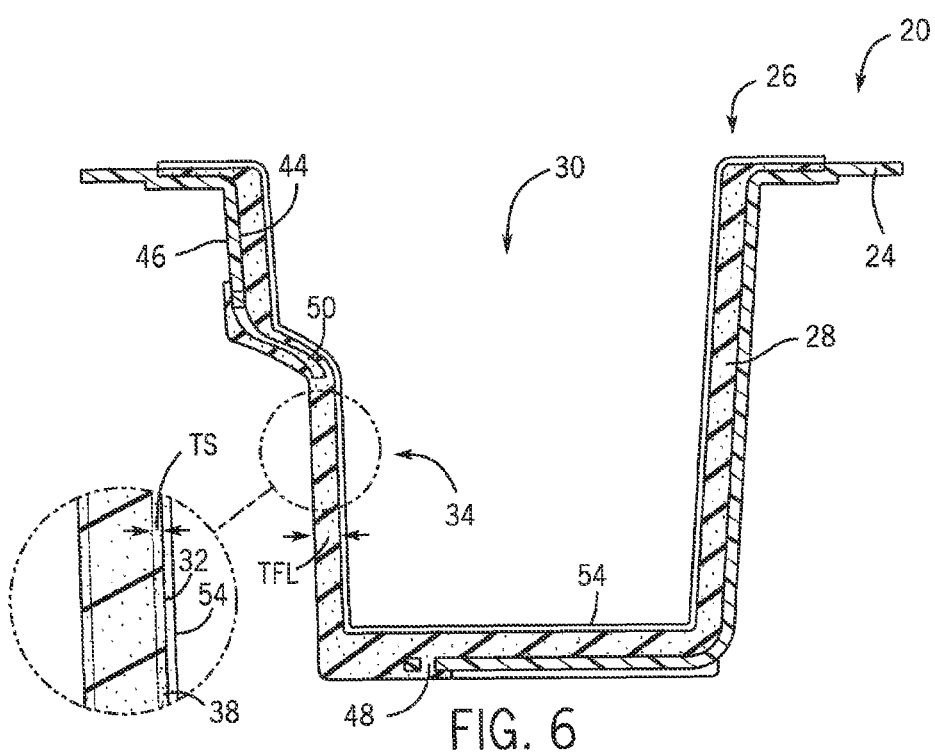
FIG. 6 is a schematic cross-sectional view of another embodiment of a cup holder assembly, according to an exemplary embodiment.

FIG. 6 is a schematic cross-sectional view of another embodiment of a cup holder assembly, according to an exemplary embodiment. According to an exemplary embodiment, the substrate includes a finger 50 (e.g., resilient finger) configured to urge the foam liner 28 in a direction toward the interior of the recess 30. According to an exemplary embodiment, the finger 50 is substantially aligned with the protrusion 34, and configured to bias the protrusion 34 toward the illustrated extended position. The finger 50 enhances the resistance to deformation of the protrusion 34, increasing the contact force between the protrusion 34 and a beverage container. According to an exemplary embodiment, the finger 50 may be molded with the substrate 24. Alternatively, the finger 50 may be separately formed (e.g., from spring steel) and coupled to the substrate 24. A single finger is shown and one or more fingers may be provided for each protrusion. According to an exemplary embodiment, one or more fingers may be positioned between protrusions to control the shape and/or deformation of the foam liner.

According to an exemplary embodiment, the cup holder assembly 20 includes a decorative layer 54 applied to the surface 32 of the skin. According to an exemplary embodiment, the decorative layer 54 may be formed via an in-mold painting process. In such a process, a layer of paint is applied to the mold before the foam compounds are injected. The paint bonds with the foam adjacent to the inner surface of the mold, establishing a desired color of the flexible outer skin. Forming the decorative layer 54 via an in-mold painting process may substantially reduce the duration and/or complexity of the painting process, as compared to spraying paint onto the surface of the concave recess. According to an exemplary embodiment, an additional or alternative decorative layer (e.g., an applique, a post-molding painted layer, etc.) may be applied to the surface 32 of the skin 38 to enhance the appearance of the cup holder assembly 20.

Figure 7:
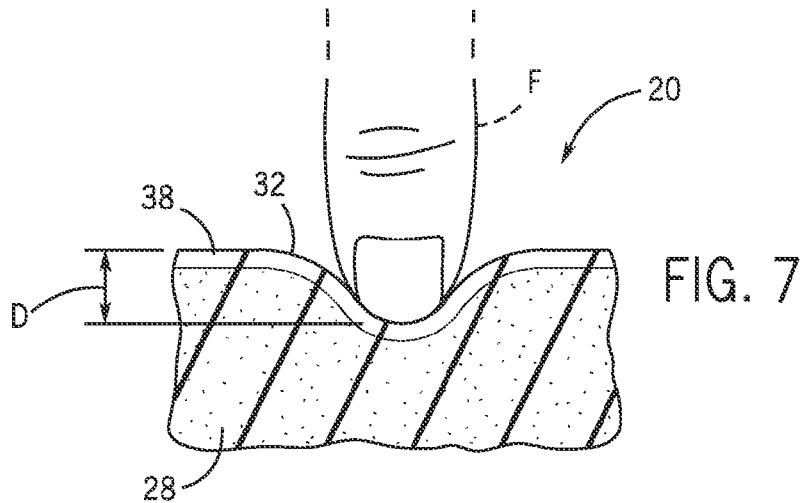
FIG. 7 is a schematic detailed cross-sectional view of the cup holder assembly of FIG. 5, according to an exemplary embodiment.

FIG. 7 is a schematic detailed cross-sectional view of the cup holder assembly of FIG. 5, according to an exemplary embodiment, illustrating compression of the foam liner and corresponding flexure of the skin. The foam liner 28 is bonded to the substrate and configured to deform under a load. The protrusions 34 are configured to flex upon contact with a beverage container, enabling the recess 30 to accommodate beverage containers of various diameters. The skin 38 is configured to flex as the foam liner 28 deforms, to protect the foam liner 28 (e.g., from liquid within the recess 30), and to provide a desired appearance of the cup holder assembly 20.

Softness of the foam liner 28 may be measured by determining the resistance of the liner to deformation. A variety of tests may be employed to determine the resistance to deformation of the liner. For example, one known indentation force deflection (IFD) test measures the force sufficient to indent a 50 square inch liner section by a fraction (e.g., 25%) of its thickness. According to the 25% IFD test, soft materials may have a range of approximately between 6 to 24 pounds, intermediate materials may have a range of approximately between 24 to 36 pounds, and hard materials may have a range of approximately between 36 to 45 pounds. According to an exemplary embodiment, the foam liner 28 may be composed of a material having a 25% IFD of approximately between 24 to 36 pounds. Such a softness range may provide the protrusions 34 with sufficient flexibility to accommodate beverage containers of various diameters. Alternative embodiments may employ liners having a higher or lower softness to achieve the desired properties of the soft component.

The skin 38 may provide durability, while maintaining flexibility. Flexibility and durability of the skin 38 may be measured by determining the hardness of the constituent material. One measure of hardness is the resistance to indentation, otherwise referred to as Durometer, denoted in the Shore A scale, for example. Within the Durometer scale, materials are generally characterized by ranges. Hard or rigid elastomers generally include those having a Durometer greater than about 90 Shore A, soft elastomers generally include those having a Durometer of about 60 Shore A to about 90 Shore A, and super-soft elastomers generally include those having a Durometer below about 60 Shore A. According to an exemplary embodiment, the skin 38 may have a Durometer of approximately between 20 to 60 Shore A. Such a configuration may facilitate bending of the skin 38, while maintaining durability and smoothness of the surface 32. Alternative embodiments may include an skin 38 having a Durometer of less than 20 Shore A or more than 60 Shore A.

According to an exemplary embodiment, an occupant finger F is depressing the foam liner 28, inducing the skin 38 to flex. According to an exemplary embodiment, where the finger F contacts the foam liner 28, the outer skin 38 translates a distance D, compressing the foam liner 28. A curvature is induced within the skin 38. Because the skin 38 is flexible, the possibility of crack formation is substantially reduced or eliminated. Because the foam liner 28 is compressible, the protrusions 34 may be suitable to accommodate beverage containers of various diameters.

According to an exemplary embodiment, the foam liner 28 is formed from a thermoset resin, such as polyurethane, polyimide, or polyester. The foam liner 28 may readily return to an initial shape when a force is removed from the liner. For example, when a beverage container is removed from the recess, each protrusion may quickly return to an initial shape (e.g., the extended position), enabling the protrusions to capture a subsequent beverage container. The rate of return may be substantially independent of a temperature of the foam liner. For example, if a warm beverage container is removed from the recess, the protrusions may readily return to the initial shape, as compared to protrusions formed from a thermoplastic elastomer which may maintain a deformed shape after being heated.

Figure 8:
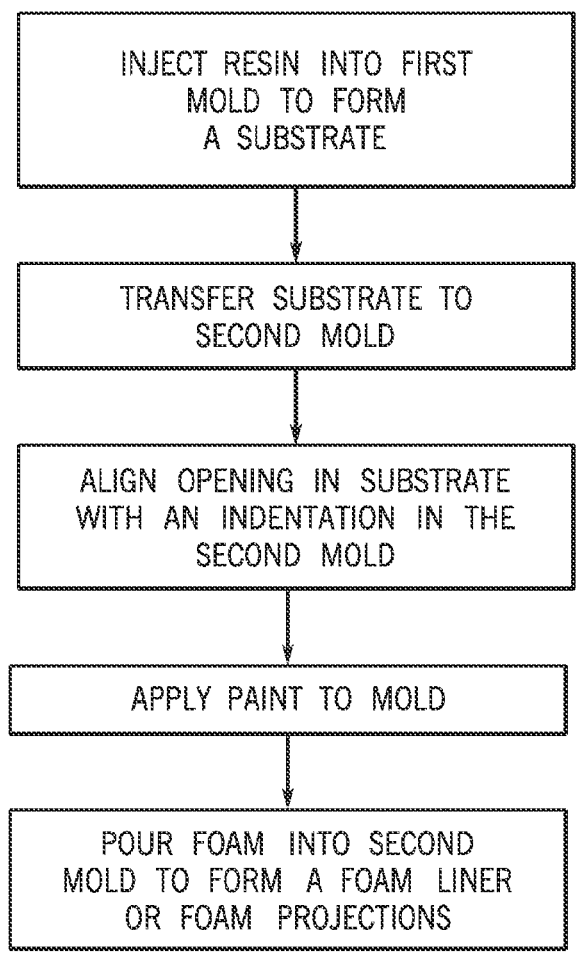
FIG. 8 is a schematic process flow diagram of an embodiment of a method of manufacturing a storage compartment, according to an exemplary embodiment.

FIG. 8 is a schematic process flow diagram of an embodiment of a method of manufacturing a storage compartment, according to an exemplary embodiment. First, a resin is injected into a first mold to form a substrate. The resin may be a thermoplastic polymer, such as polyamide, polycarbonate, or acrylonitrile butadiene styrene (ABS), for example. Any suitable resin appropriate for injection molding may be utilized in alternative embodiments. The resin may be selected to form a substrate having sufficient rigidity to support the foam liner or the foam projections during operation of the vehicle and during insertion and removal of beverage containers. According to an exemplary embodiment, the first mold includes a projecting feature configured to form a corresponding opening within the substrate. The opening is configured to facilitate deformation of the protrusion beyond the radial extent of the cup holder recess, enabling the recess to accommodate larger diameter beverage containers. Foam may extend through the opening to form a foam projection configured to support an object within the storage compartment.

After the first resin has cured and/or hardened, the substrate is transferred to a second mold for forming the foam liner or the foam projections. During or after the transfer, the opening in the substrate is aligned with an indentation in the second mold. According to an exemplary embodiment, the indentation is configured to form the protrusion within the foam liner such that the protrusion is aligned with the opening, enabling the recess to accommodate larger diameter beverage containers. According to an exemplary embodiment, the indentation is configured to form one of the foam projections such that the foam projection is aligned with the opening and configured to support an object within the storage compartment. Next, paint is applied to the second mold to establish a desired color of the flexible outer skin and/or to provide a layer of ultraviolet protection for the foam liner or the foam projections. The paint may be applied to an inner surface of the second mold such that the paint bonds with the portion of the poured foam that forms the outer skin. The outer skin may achieve a desired base color. Foam may then be poured into the second mold to form the foam liner or the foam projections. Two reactive compounds may be mixed and poured into the mold, forming the foam liner or the foam projections. Due to the material chemistry as well as temperature variations within the mold, a high density flexible outer skin is formed around the low density foam liner/projections. The foam liner/projections bond to the substrate during the foaming process (e.g., while the foam expands and cures). Once the molding process is complete, the cup holder assembly may be removed from the mold.

The foam liner/projections are bonded to the substrate during the foaming process in the present embodiment, and other coupling techniques may be employed in alternative embodiments. For example, the foam liner/projections may be molded separately from the substrate, and then attached to the substrate by an adhesive connection or a mechanical connection. According to an exemplary embodiment, the substrate may support the liner without being coupled to the liner, facilitating removal of the liner from the cup holder assembly.

Figure 9:
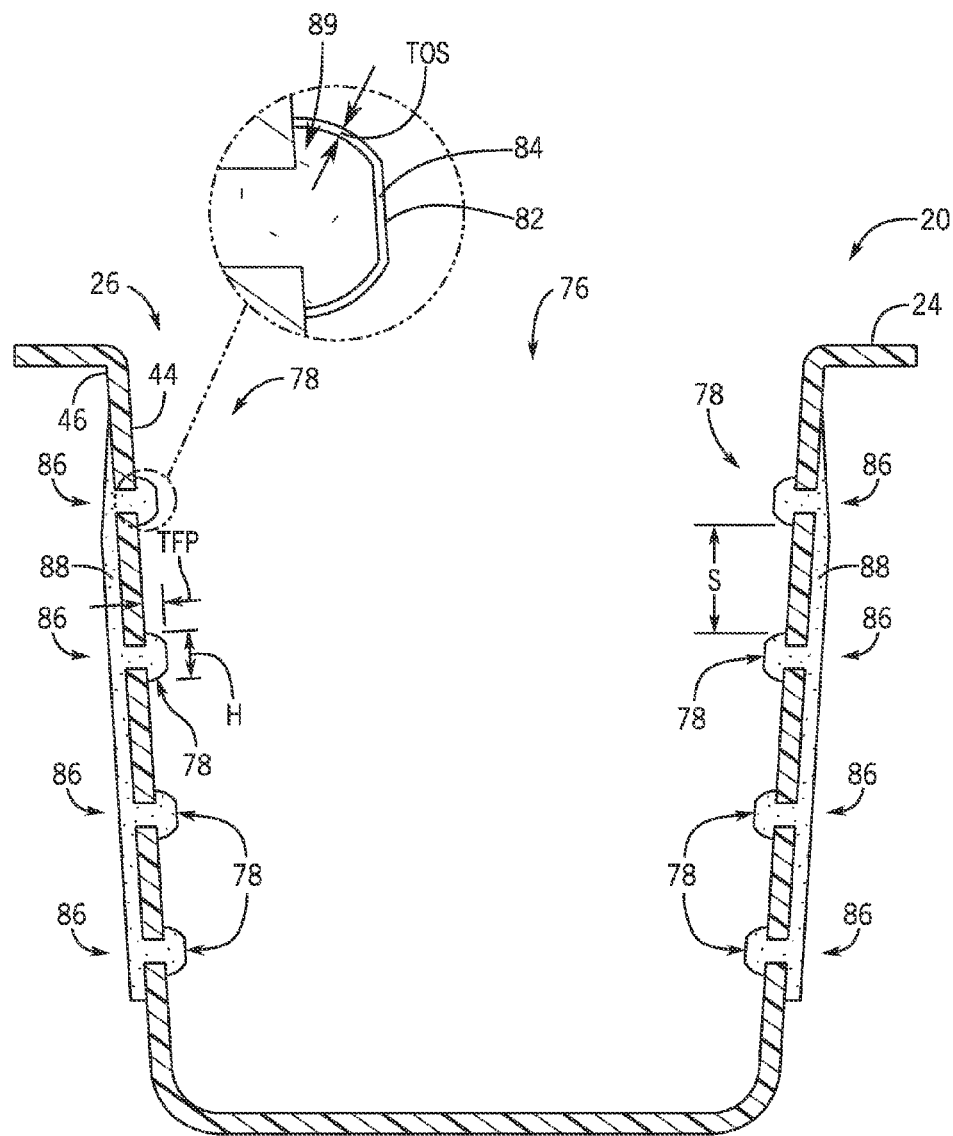
FIG. 9 is a schematic cross-sectional view of an embodiment of a cup holder assembly having foam projections with skin, according to an exemplary embodiment.

FIG. 9 is a schematic cross-sectional view of an embodiment of a cup holder assembly 20 having foam projections with skin, according to an exemplary embodiment. According to an exemplary embodiment, the substrate 24 forms a cavity or recess 76 within the cup holder assembly 20. Multiple foam projections 78 are coupled to the substrate 24 and configured to support an object (e.g., beverage container) within the cavity/recess 76. According to an exemplary embodiment, each projection 78 extends inwardly along a radial axis from the interior surface 44 of the substrate cavity/recess 76. A surface 82 of each projection 78 is configured to engage the object (e.g., beverage container)

to support the object within the cavity/recess 76. The foam projections 78 include a skin 84 that forms the surface 82 of each projection 78.

According to an exemplary embodiment, the substrate 24 includes multiple openings 86 configured to enable foam to extend through the substrate 24 from the exterior surface 46 to the interior surface 44. The foam extending through the openings 86 connects each foam projection 78 to a foam support 88 positioned outwardly from the substrate 24 along the radial axis. According to an exemplary embodiment, the foam support 88 bonds to the exterior surface 46 of the substrate 24 during the molding process, securing the foam projections 78 to the substrate. According to an exemplary embodiment, each foam projection 78 includes a mounting portion 89 configured to bond to the interior surface 44 of the substrate 24 during the molding process to further secure the projections 78 to the substrate 24. Contact between the foam support 88 and the exterior surface 46, and contact between the mounting portions 89 and the interior surface 44 mechanically couples the foam to the substrate 24. Contact between these surfaces may also establish a seal that substantially blocks liquid flow (e.g., from condensation on a beverage container, from leakage from the beverage container, etc.) through the cavity/recess 76, substantially reducing or eliminating the possibility of contact between liquid and electronic components beneath the cup holder assembly. The illustrated cup holder assembly includes the foam support 88, and each projection 78 includes a respective mounting portion 89. The foam support 88 and/or the mounting portions 89 may be omitted.

The substrate 24 may be formed by an injection molding process. Injection molding involves injecting liquid resin into a mold to form a completed part. Once the substrate 24 has been formed, the substrate 24 may be placed into a mold having a cavity shaped to form the foam projections 78 and the foam support 88. Foam may then be poured into the mold. During the foaming process (e.g., while the foam expands and cures), the foam bonds to the substrate 24, forming a unitary structure including the substrate 24 and the foam projections 78. Due to the material chemistry as well as temperature variations within the mold, a high density flexible outer skin 84 is formed around the low density foam projections 78. The skin 84 may serve to protect the low density foam (e.g., from liquid within the recess 30), while providing a desirable appearance to the cup holder assembly 20.

A decorative layer may be applied to the surface 82 of the skin 84. According to an exemplary embodiment, the decorative layer may be formed via an in-mold painting process. In such a process, a layer of paint is applied to the mold before the foam compounds are injected. The paint bonds with the foam adjacent to the inner surface of the mold, establishing a desired color of the flexible outer skin. Forming the decorative layer via an in-mold painting process may substantially reduce the duration and/or complexity of the painting process, as compared to spraying paint onto the surface of the foam projections 78. According to an exemplary embodiment, an additional or alternative decorative layer (e.g., an applique, a post-molding painted layer, etc.) may be applied to the surface 82 of the skin 84 to enhance the appearance of the cup holder assembly 20.

A thickness TOS of the skin 84 may be particularly selected to enable the skin to flex as the foam projections 78 are compressed (e.g., via contact with a beverage container). For example, the thickness TOS of the skin 84 may be less than approximately 2, 1.5, 1, 0.5, 0.3, 0.2, or 0.1 mm, or less. A height H (e.g., extension along an axial direction) of each foam projection 78 may be particularly selected to accommodate desired beverage container shapes/configurations and/or to provide a desired aesthetic appearance. For example, the height H of each foam projection 78 may be about 1 mm to about 50 mm, about 5 mm to about 40 mm, about 10 mm to about 30 mm, or about 20 mm. A spacing S between adjacent foam projections 78 along the axial direction may be selected to accommodate desired beverage container shapes/configurations and/or to provide a desired aesthetic appearance. For example, the spacing S between adjacent foam projections may be about 1 mm to about 50 mm, about 5 mm to about 40 mm, about 10 mm to about 30 mm, or about 20 mm.

A thickness TFP (e.g., extension along the radial axis) of each foam projection 78 may be particularly selected to provide the foam projections 78 with a desired degree of deformation (e.g., to accommodate beverage containers having varying diameters). For example, thicker projections 78 may facilitate greater deformation, and thinner projections 78 may facilitate less deformation. According to an exemplary embodiment, the thickness TFP may be greater than approximately 5 mm. For example, the thickness TFP may be approximately between 5 to 15, 6 to 13, 7 to 11, or about 9 mm.

The extent of each projection 78 in the circumferential direction may be particularly selected to accommodate desired beverage container shapes/configurations and/or to provide a desired aesthetic appearance. For example, certain foam projections may extend about 1 percent to about 75 percent of the perimeter (e.g., circumference) of the cavity/recess 76. For example, certain foam projections may extend about 5 percent to about 60 percent, about 10 percent to about 50 percent, about 20 percent to about 40 percent, or about 30 percent of the perimeter (e.g., circumference) of the cavity/recess 76. According to an exemplary embodiment, the position of one or more foam projections along the axial direction may vary with position along the circumferential direction. For example, certain foam projections 78 may form a helical/spiral shape along the interior surface 44 of the cavity/recess 76.

The cross-sectional shape of each foam projection may be particularly selected to accommodate desired beverage container shapes/configurations and/or to provide a desired aesthetic appearance. For example, certain foam projections may taper inwardly along the radial direction, reducing the contact area between the projections and the beverage container. Such a configuration may reduce the force sufficient to insert and remove the beverage container from the cavity/recess 76. The cross-sectional shape of certain foam projections 78 may vary with circumferential position. For example, the thickness TFP, the height H, and/or the shape of certain foam projections may vary (e.g., continuously or in discrete increments) around the perimeter (e.g., circumference) of the cavity/recess 76. The illustrated cup holder assembly includes eight foam projections, and alternative embodiments may include more or fewer projections. According to an exemplary embodiment, the cup holder assembly may include 2, 3, 4, 5, 6, 8, 10, 12, 15, 20, or more foam projections, each having a skin.

Figure 10:
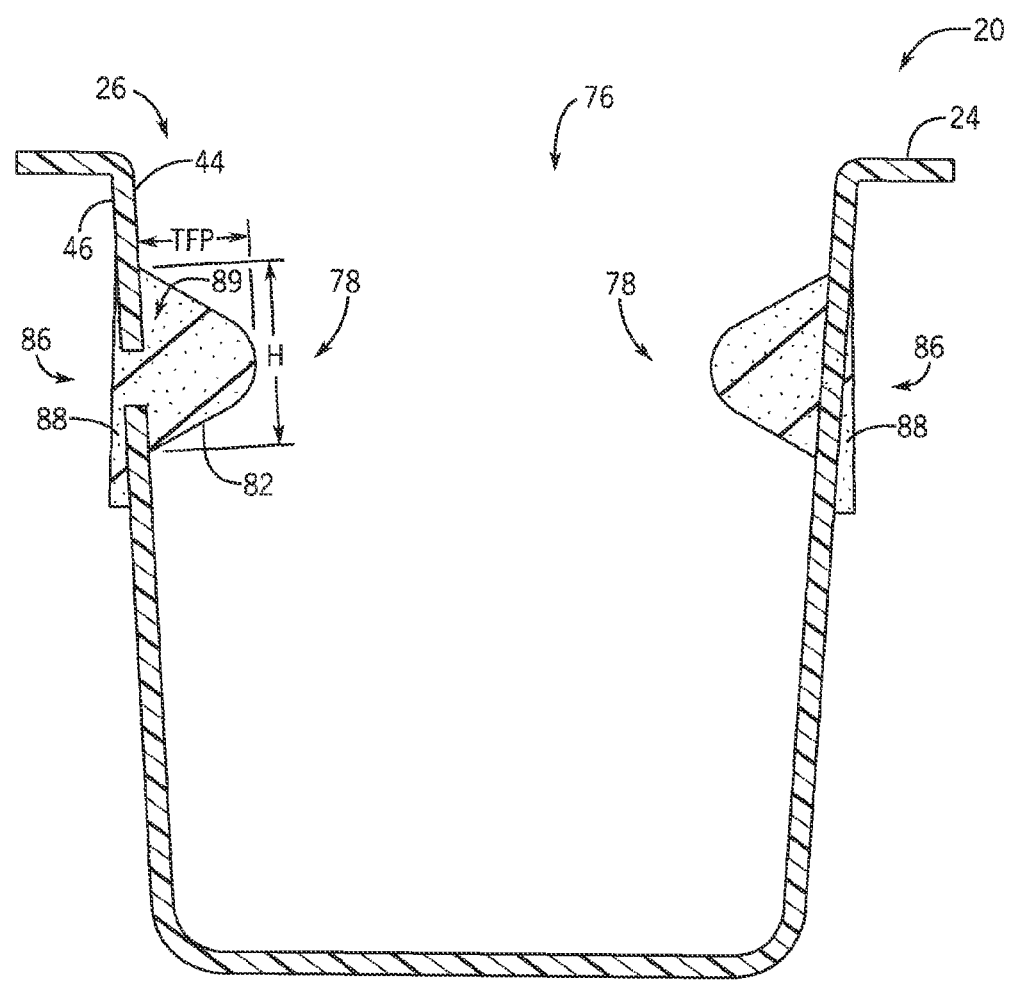
FIG. 10 is a schematic cross-sectional view of another embodiment of a cup holder assembly having foam projections with skin, according to an exemplary embodiment.

FIG. 10 is a schematic cross-sectional view of another embodiment of a cup holder assembly having foam projections with skin, according to an exemplary embodiment. According to an exemplary embodiment, the foam projections 78 are distributed along the circumferential direction at a desired axial position (e.g., position along the axial direction). According to an exemplary embodiment, 2, 3, 4, 5, 6, or more foam projections 78 may be substantially evenly distributed about the perimeter (e.g., circumference) of the cavity/recess 76. According to an exemplary embodiment, the thickness TFP and the height H of the projections 78 are larger than the respective thickness and height of the projections shown in the embodiment of FIG. 9. The foam projections 78 are configured to deform (e.g., in the radial direction) upon contact with a beverage container, enabling the cavity/recess 76 to accommodate beverage containers of various diameters. Spring-loaded fingers, which may be employed in certain configurations to retain beverage containers of various diameters, are not employed, substantially reducing the manufacturing cost of the cup holder assembly 20 and/or reducing fluid flow from the cavity/recess 78 (e.g., from condensation on a beverage container, from leakage from the beverage container, etc.). The illustrated projections 76 have a substantially triangular cross-sectional shape, and other cross-sectional shapes (e.g., semicircular, polygonal, etc.) may be utilized in alternative embodiments.

A cup holder assembly is described in the disclosure, and alternative storage compartments (e.g., having a recess/cavity with a non-circular cross-section) including a foam liner or foam projections with skin may be utilized throughout the vehicle interior. For example, the vehicle may include a receptacle configured to retain a portable electronic device. In such a configuration, the receptacle may include a foam liner or foam projections having a skin forming a surface.

According to an exemplary embodiment, a vehicle interior storage compartment includes a foam liner having a recess configured to receive an object for storage. The foam liner includes an integral outer skin forming a show surface of the recess.

According to an exemplary embodiment, a vehicle interior storage compartment includes a substrate having a cavity. The vehicle interior storage compartment also includes a foam feature coupled to the substrate and extending radially inward from the cavity. The foam feature is configured to support an object within the cavity, and the foam feature comprises an integral outer skin forming a show surface of the foam feature.

According to an exemplary embodiment, a method of manufacturing a vehicle interior storage compartment includes injecting resin into a first mold to form a substrate. The method also includes transferring the substrate to a second mold having a cavity configured to receive the substrate. The method includes pouring foam into the second mold such that the foam forms a foam liner or multiple foam projections coupled to the substrate and having an integral outer skin.

Only certain features and embodiments of the invention have been illustrated and described, and many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. In an effort to provide a concise description of the exemplary embodiments, all features of an actual implementation may not have been described (i.e., those unrelated to the presently contemplated best mode of carrying out the invention, or those unrelated to enabling the claimed invention). In the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of the disclosure, without undue experimentation.

The invention claimed is:

1. A receptacle for a vehicle interior configured to hold a container comprising:
a substrate; and
a liner comprising a base and a skin;
wherein the liner comprises at least one protrusion configured to deform to accommodate the container;
wherein the liner comprises foam bonded to the substrate as the liner is formed, and
wherein the substrate comprises a finger aligned with the at least one protrusion configured to resist deformation of the protrusion.

2. The receptacle of claim 1 wherein the substrate further comprises an aperture and the liner extends through the aperture to secure the liner to the substrate.

3. The receptacle of claim 1 wherein the substrate further comprises at least one opening and the liner extends through the at least one opening.

4. The receptacle of claim 1 wherein the substrate further comprises at least one opening and the at least one protrusion is aligned with the at least one opening and configured to deform to accommodate the container.

5. The receptacle of claim 1 wherein the forming of the liner comprises the steps of: providing the substrate in a mold; and providing foam in the mold to form the liner and bond the liner to the substrate.

6. The receptacle of claim 1 wherein the liner is formed from at least one of (a) a thermoset resin, (b) polyurethane, (c) polyimide, (d) polyester.

7. A receptacle for a vehicle interior configured to hold a container comprising:
a substrate comprising an opening and providing an inner surface; and
a protrusion formed in the opening;
wherein the protrusion is configured to deform into the opening to accommodate the container, and
wherein the substrate comprises an interior surface and an exterior surface;
and the protrusion extends through the opening from the interior surface to the exterior surface.

8. The receptacle of claim 7 wherein the protrusion is secured to the substrate by at least one of (a) an adhesive connection, (b) a mechanical connection, (c) a molding process.

9. The receptacle of claim 7 wherein the protrusion is formed from foam comprising a skin configured to substantially block flow of the beverage through the protrusion.

10. The receptacle of claim 7 wherein the protrusion comprises a skin providing a protective layer for the protrusion.

11. The receptacle of claim 9 wherein the skin is at least one of (a) substantially smooth, (b) textured.

12. The receptacle of claim 9 wherein the protrusion further comprises a layer of paint on the skin.

13. The receptacle of claim 7 wherein the protrusion is configured to deform beyond the inner surface of the substrate.

14. A receptacle for a vehicle interior configured to hold a container comprising:

a substrate comprising an opening and providing an inner surface;

a liner comprising (a) a base formed from a foam material and a skin and (b) a protrusion formed in the opening of the substrate;

wherein the skin is formed from the foam material of the base; and wherein the protrusion is configured to deform beyond the inner surface of the substrate into the opening to accommodate the container.

15. The receptacle of claim 14 wherein the base and the skin are formed from the foam material in a mold.

16. The receptacle of claim 14 wherein the base comprises a density and the skin comprises a density; wherein the density of the skin is greater than the density of the base.

17. The receptacle of claim 14 wherein the base and the skin are formed by expanding and curing the foam material.

18. The receptacle of claim 14 wherein the skin is textured.

19. The receptacle of claim 14 wherein the liner is configured to deform to accommodate the container.

20. A receptacle for a vehicle interior configured to hold a container comprising:

a substrate; and a foam liner comprising a skin secured to the substrate during a forming process;

wherein the foam liner comprises at least one protrusion configured to deform to accommodate the container;

wherein the substrate further comprises a finger aligned with the at least one protrusion configured to resist deformation of the protrusion.

* * * * *